(12) United States Patent
Ram

(10) Patent No.: US 7,581,350 B2
(45) Date of Patent: Sep. 1, 2009

(54) GARDENING APPARATUS FOR SHIELDING DESIRED VEGETATION AND SURROUNDING AREAS FROM UNWANTED CONTACT WITH A SPRAYED CHEMICAL

(75) Inventor: Richard M. Ram, Kennett Square, PA (US)

(73) Assignee: RASCO, LLC, Kennett Square, PA (US)

( * ) Notice: Subject to any disclaimer, the term of this patent is extended or adjusted under 35 U.S.C. 154(b) by 0 days.

(21) Appl. No.: 11/526,962

(22) Filed: Sep. 26, 2006

(65) Prior Publication Data

US 2008/0072482 A1    Mar. 27, 2008

(51) Int. Cl.
*A01B 41/00*    (2006.01)
*A01M 21/04*    (2006.01)
*A01M 7/00*    (2006.01)
*A01G 13/02*    (2006.01)

(52) U.S. Cl. .............................. 47/1.7; 47/1.5; 47/20.1
(58) Field of Classification Search .................. 47/1.43, 47/1.5, 1.7, 20.1, 22.1, DIG. 11; 56/330–333
See application file for complete search history.

(56) References Cited

U.S. PATENT DOCUMENTS

| | | | | |
|---|---|---|---|---|
| 219,987 | A * | 9/1879 | Scott ........................... | 47/32.4 |
| 268,950 | A * | 12/1882 | Simkins ....................... | 56/333 |
| 915,897 | A * | 3/1909 | Skorness ...................... | 47/32 |
| 1,135,989 | A * | 4/1915 | Breach ......................... | 30/248 |
| 2,824,743 | A * | 2/1958 | Humby ........................ | 222/474 |
| 3,185,397 | A * | 5/1965 | Nelson ........................ | 239/556 |
| 3,210,084 | A * | 10/1965 | Van Der Lely et al. ......... | 47/1.7 |
| 3,237,346 | A * | 3/1966 | Watts ........................... | 47/1.7 |
| 3,527,492 | A | 9/1970 | Hollis | |
| 4,637,164 | A * | 1/1987 | Brown ......................... | 47/32.5 |
| 4,709,839 | A * | 12/1987 | Tucker ......................... | 223/119 |
| 4,947,580 | A * | 8/1990 | Moore .......................... | 47/1.5 |
| 4,962,957 | A | 10/1990 | Traber | |
| 5,009,369 | A * | 4/1991 | Iwaszkowiec ............... | 239/223 |
| 5,329,727 | A * | 7/1994 | Dixon .......................... | 47/1.5 |
| 5,499,474 | A | 3/1996 | Knooihuizen | |
| 5,724,765 | A * | 3/1998 | Wegner ........................ | 47/1.5 |

(Continued)

FOREIGN PATENT DOCUMENTS

FR    2696072 A1 *    4/1994

*Primary Examiner*—Rob Swiatek
*Assistant Examiner*—Kristen C Hayes
(74) *Attorney, Agent, or Firm*—Robert R. Axenfeld; Montgomery, McCracken, Walker & Rhoads, LLP

(57) ABSTRACT

A gardening apparatus that isolates a targeted plant for spraying of chemicals such as herbicides, while protecting desired vegetation in proximity to the targeted plant. The gardening apparatus can be held and operated in one hand, while the other hand is used to operate a sprayer. The apparatus includes an elongated shaft that permits a user to spray a targeted plant from a safe distance such as in an erect position. Located at the distal end of the shaft is a shield, and on the opposite proximal end of the shaft is a hand control mechanism for adjusting the opening and closing of the shield around a plant stem. The adjustability of the opening/closing of the shield through the hand control mechanism permits targeting of different sized stems as the shield can be adjustably configured to surround the stem, whether thick or thin, without having to touch the targeted plant by hand.

16 Claims, 7 Drawing Sheets

U.S. PATENT DOCUMENTS

| | | |
|---|---|---|
| 6,065,244 A | 5/2000 | Randle |
| 6,145,756 A | 11/2000 | Kohls |
| 6,848,731 B2 | 2/2005 | Khubani et al. |
| 6,874,833 B2 | 4/2005 | Keith et al. |

* cited by examiner

GARDENING APPARATUS FOR SHIELDING DESIRED VEGETATION AND SURROUNDING AREAS FROM UNWANTED CONTACT WITH A SPRAYED CHEMICAL

TECHNICAL FIELD

This invention relates to a gardening apparatus used in conjunction with liquid chemical sprayers. More particularly, this invention relates to a gardening apparatus for shielding desired vegetation and surrounding areas from unwanted contact with a liquid chemical when the liquid chemical is sprayed on a targeted plant, such as a weed.

BACKGROUND

Herbicides are commonly used to kill plants, such as weeds, exotic plants, grass, poison ivy, and other undesirable flora. Most herbicides are sprayed directly onto a selected plant in the form of a liquid chemical. The spray comes into contact with and is absorbed by tissues of the plant. The herbicide then interrupts metabolic processes of the plant, which eventually causes it to die shortly thereafter.

As many weed killers and herbicides are indiscriminate, they will kill any plant in which they come into contact with including desired vegetation. A major concern, therefore, of gardeners is to avoid inadvertently spraying herbicide onto desired vegetation surrounding the plant targeted for application of the herbicide. This may be especially difficult if desired vegetation lies underneath the targeted plant or in close proximity to the targeted plant. When desired vegetation is in close proximity to the targeted plant, it may unavoidably be within the spray path of the liquid herbicide, or can easily be contacted by the herbicide through splashing or splattering of the liquid chemical when deflected off the targeted plant.

It is also common for liquid herbicide to drip from the nozzle of a sprayer after dispensing spray when moving the sprayer from one location to another. This may cause herbicide to fall from the nozzle of the sprayer onto desired foliage. Other situations in which herbicide may contact desired vegetation occurs during windy conditions, which may cause the herbicide to drift off its intended spray path and onto desired vegetation or simply through human error (i.e., poor aim) or inaccurate sprayers as well. Accordingly, it is difficult to limit the spray path of the herbicide to the targeted plant. Often liquid herbicide comes into contact with surrounding vegetation, and as a result desired vegetation is often inadvertently killed.

One attempt to solve this problem is described in U.S. Pat. No. 6,065,244 (the '244 patent) to Randle, which shows a handheld funnel that is placed around a plant stem, and held in position while hand spraying the plant. The funnel is intended to shield surrounding vegetation from application of the herbicide spray.

One drawback associated with a handheld shielding device is the short length of the handle attached to the funnel and its close proximity to the body of the funnel. The short length of the handle forces a gardener to bend down (or kneel) to position the shield by hand around a portion of a weed, which can be awkward and tedious. Still another disadvantage of having the handle so close to the funnel is the potential for exposing the gardener's hand/arm/skin to potentially dangerous exposure to chemical spray. There is also a higher probability that being within an arm's reach of the targeted plant, the gardener will inhale toxic chemicals, especially when the liquid spray splashes off the targeted plant, the funnel itself, or there is mist associated with the sprayed chemical. Accordingly, gardener safety remains a problem with a handheld funnel device.

Another drawback associated with a conventional handheld shield device is that they have a fixed slot size which is not adjustable. This is problematic when targeting weeds with stem sizes that are thicker or much smaller than the slot of the funnel. With stems thicker than the diameter of the slot it may be difficult to position the fixed-sized funnel around the stem of such weeds. On the other hand, a fixed size slot with a diameter much larger than the stem of a weed creates a gap between the stem of the weed and the opening of the funnel. The gap provides a pathway for spray to pass through the shield and come into contact with underlying vegetation which the shield is attempting to protect.

Other attempts have been made to develop systems to control the application of liquid chemicals sprayed on selected plants. Few, if any, are readily available to gardeners in the market place as they are often inconvenient, impractical, expensive, or are not suitable for use with all types of herbicide sprayers, such as pump spray bottles.

SUMMARY

Described herein is a gardening apparatus that effectively isolates a targeted plant for spraying of liquid chemicals such as herbicides, while protecting desired vegetation in proximity to the targeted plant. The gardening apparatus can be held and operated in one hand, while the other hand is used to operate a sprayer. The gardening apparatus includes an elongated shaft facilitating the spraying of a targeted plant from a safe distance such as in an erect position. Located at the distal end of the shaft is a shield, and on the opposite proximal end of the shaft is a hand control member for adjusting the opening and closing of the shield around a targeted plant. The adjustability of the opening/closing of the shield through the hand control mechanism permits targeting of different sized stems as the shield can be configured to conform and fit around (e.g. surround) the stem of a weed whether thick or thin. As there is little-to-no gap once the shield is positioned around the stem of a plant, underlying vegetation can be substantially protected from contact with the spray path of liquid chemicals. The shield also protects vegetation located in proximity to the targeted plant, as the shield extends a distance around the targeted stem providing a solid barrier to liquid chemicals.

In one embodiment, the apparatus includes an elongated shaft having at least two movable members at a distal end, and a control member on the opposite proximal end of the elongated shaft. The two movable members may initially be biased apart in an open position. The two movable members may move toward each other in reciprocating fashion from the open position to a closed positioned by manipulating the hand control member. When the two members come together in a closed position they collectively form a unitary shield, which serves as a barrier. The two movable shield members may be misaligned slightly permitting one member to slide underneath (or overlap) the other when the two movable members come together when forming the unitary shield. A half circular cutout is positioned on each shield member in opposing complementary fashion such that when the two movable members of the shield come together each half of the circular cutout meets the other to form a full circular cutout in the shield. As the two members overlap, the size of the circular cutout between the members can be adjusted in size by controlling how far the two movable members are closed, i.e., moved toward each other in reciprocating fashion. This allows the cutout in the shield to conform and adjust to different sized stems of weeds or other types of plants.

When the shield is positioned around a targeted plant in a closed position usually at the base of the stem of a plant, it isolates the targeted plant from surrounding vegetation such that the targeted plant can be sprayed with a liquid vegetation killer (or other liquid chemical, such as insecticide) while shielding surrounding areas and desirable flora from being contacted by spray. The elongated shaft, approximately three feet long, allows the gardener to position the shield around a targeted weed without having to bend down or directly touch the targeted plant by hand.

The hand control member and length of the shaft permits a user of the gardening apparatus to use one hand to open/close and position the shield, while simultaneously using the other hand to operate a chemical sprayer.

Additional exemplary implementations and features/advantages are described in the Detailed Description in conjunction with the accompanying drawings below. The scope of the invention is recited in the Claims.

BRIEF DESCRIPTION OF THE DRAWINGS

The detailed description is explained with reference to the accompanying figures. It should be noted that the figures are not necessarily drawn to scale and are for illustration purposes only.

DETAILED DESCRIPTION

Reference herein to "one embodiment", "an embodiment", "an implementation" or "one implementation" or similar formulations herein, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

In the following description, for purposes of explanation, specific numbers, materials and configurations are set forth in order to provide a thorough understanding of the present invention. However, it will be apparent to one skilled in the art that the present invention may be practiced without each specific example. In other instances, well-known features are omitted or simplified to clarify the description of the exemplary embodiments of the present invention, and thereby, to better explain the present invention.

The inventor intends these embodiments and implementations to serve as representative illustrations and examples. The inventor does not intend these embodiments to limit the scope of the claims; rather, the inventor has contemplated that the claimed invention might also be embodied and implemented in other ways, in conjunction with other present or future technologies.

Figure 1A:
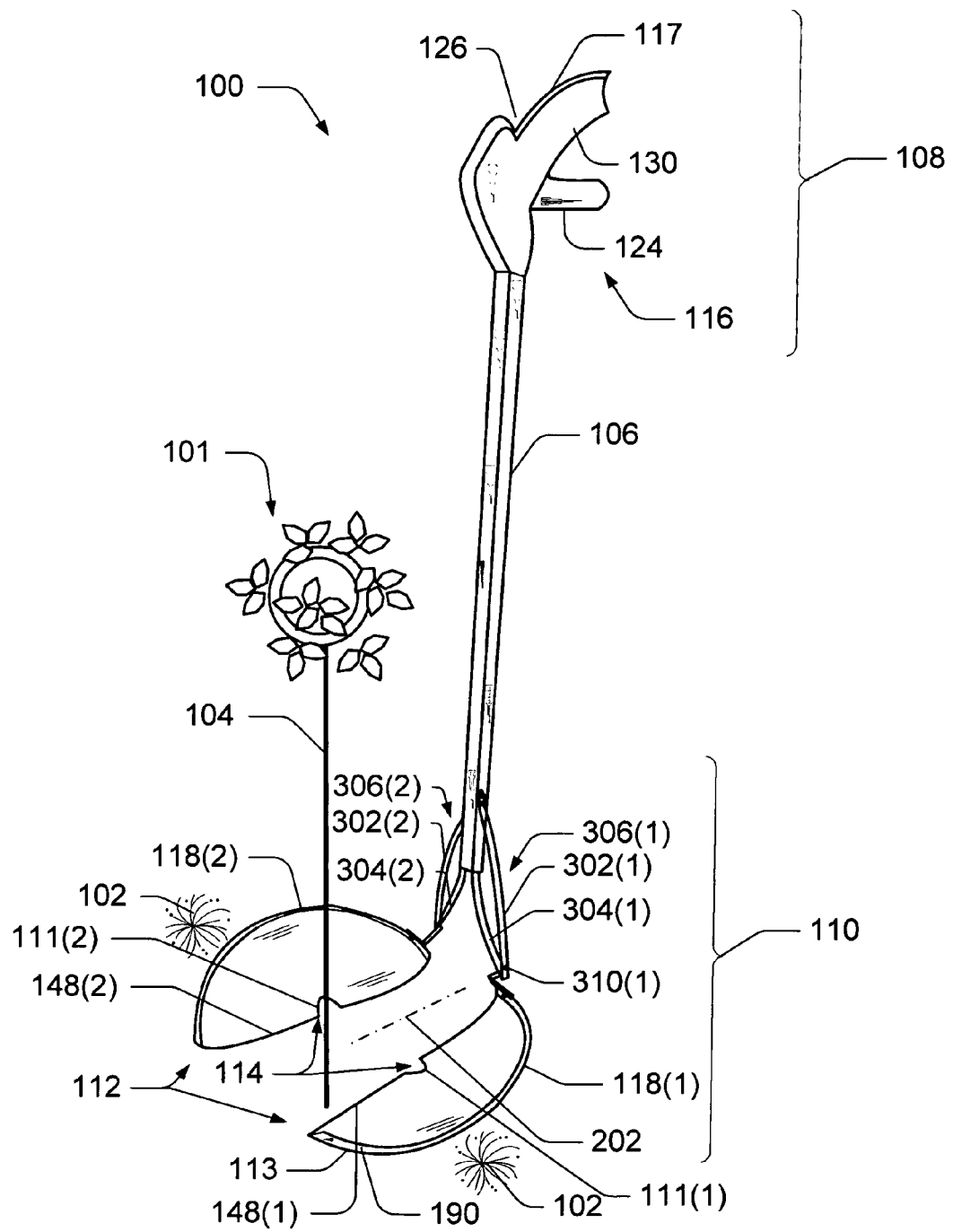
FIG. 1A illustrates a perspective view of a gardening apparatus for shielding desired vegetation and surrounding areas from unwanted contact with a liquid chemical when the liquid chemical is sprayed on a targeted plant.
Figure 1B:
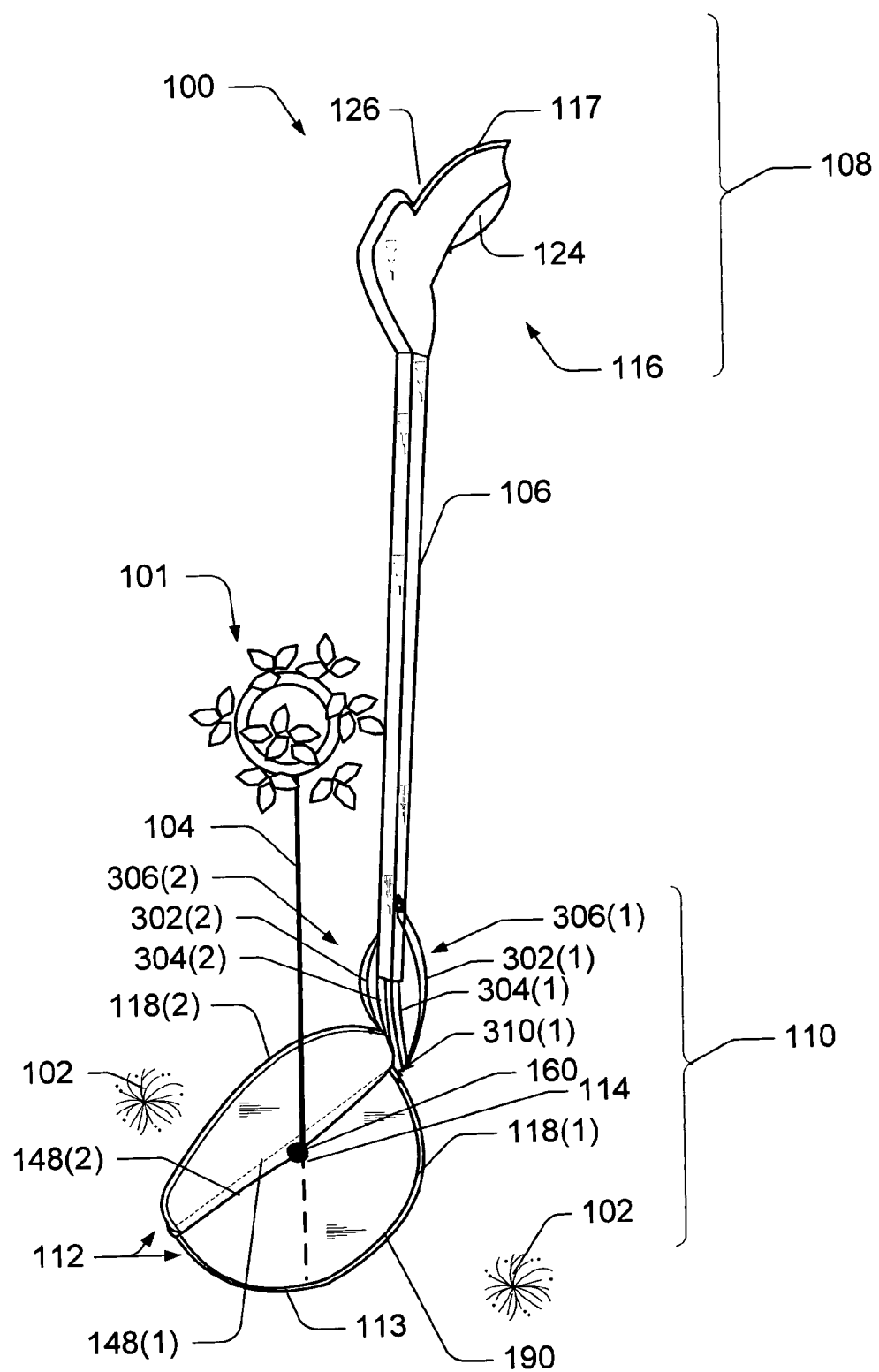
FIG. 1B is identical to FIG. 1A, but shows the shield in a closed positioned with a plant stem disposed axially therein.
Figure 2:
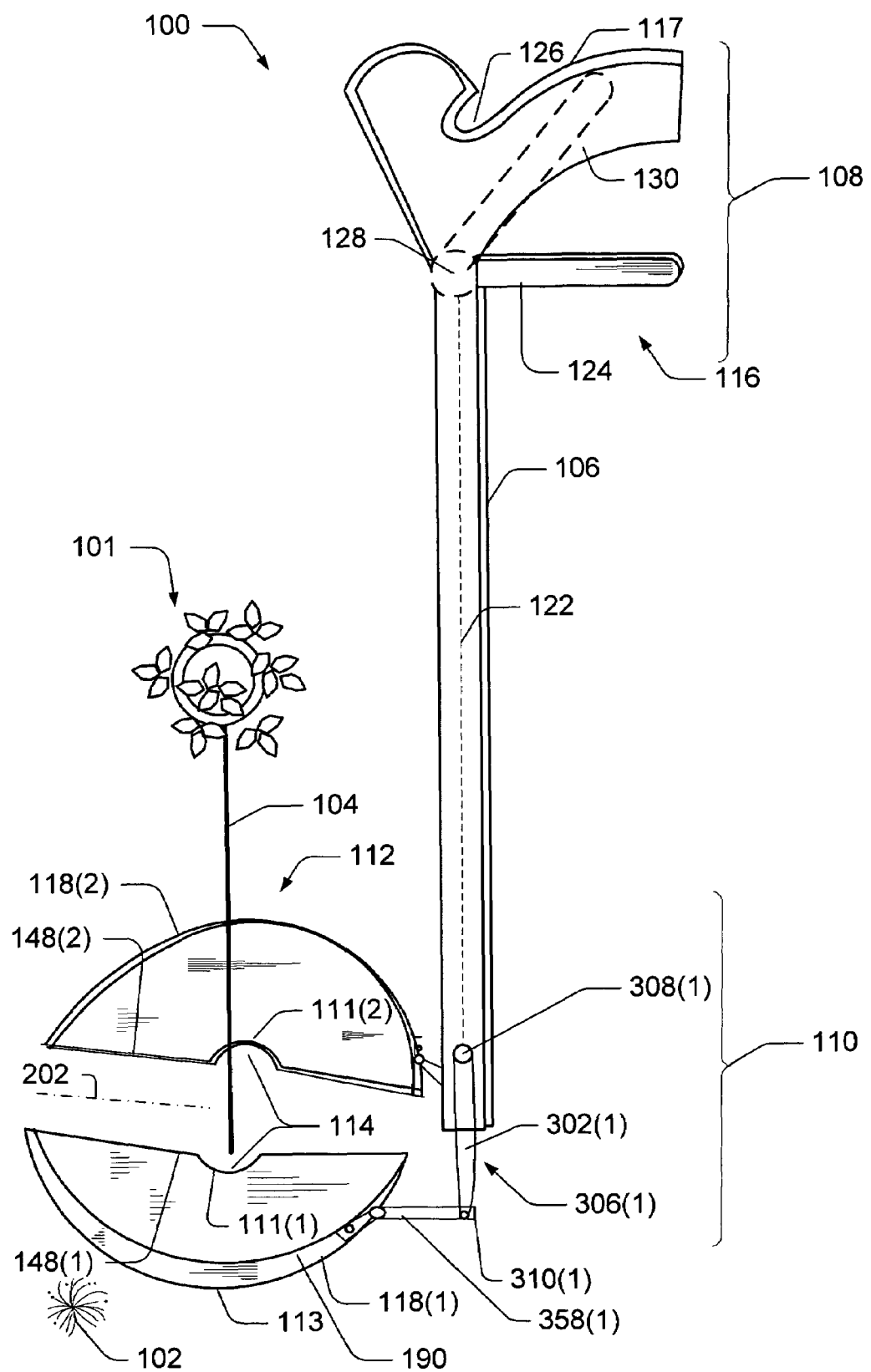
FIG. 2 is identical to FIG. 1A but shows the gardening apparatus viewed from a side with its shield in an open position.

FIG. 1A illustrates a perspective view of a gardening apparatus 100 for shielding desired vegetation 102 and surrounding areas from unwanted contact with a liquid chemical when the liquid chemical is sprayed on a targeted plant 101. FIG. 1A shows a shield 112 in an open position. FIG. 1B is identical to FIG. 1A, but shows shield 112 in a closed positioned encircling a plant stem 104 disposed axially therein. FIG. 2 is identical to FIG. 1A but shows gardening apparatus 100 with shield 112 in an open position viewed in perspective from a side.

As shown in FIGS. 1A, 1B, and 2, gardening apparatus 100 is ideally suited for use by gardeners, homeowners, landscapers, golf maintenance personnel, and possibly farmers. Gardening apparatus 100 is designed to be held and operated in a single hand of the user; while the other hand of the user is free to operate a liquid sprayer, such as pump spray bottle, or a hose spray system with a liquid reservoir. In one implementation, the overall length of gardening apparatus 100 is similar to that of a walking cane, or the like, and measures approximately 30 inches from the top 117 to bottom 113. The overall length of apparatus 100 may vary, slightly longer or shorter, to accommodate varying heights of individual users specific spraying applications. It should also be appreciated by those skilled the art with the benefit of this detailed disclosure that the length of apparatus 100 may be adjustable, such as through the use of an adjustable shaft (not shown).

Gardening apparatus 100 includes an elongated shaft 106 with a proximal end portion 108 and a distal end portion 110. Shaft 106 may be constructed of any suitable material, but is preferably of a constructed of lightweight material such as plastic or aluminum, and may be of a hollow construction. Elongated shaft 106 is approximately two feet in length, but may be slightly longer or shorter. For instance, a shaft of approximately three-to-four feet in length may be preferable for a taller user of apparatus 100, whereas a shaft of approximately two feet in length may be suitable for adult users of average height.

In the embodiment of FIGS. 1A, 1B, and 2, gardening apparatus 100 also includes a shield 112, an aperture 114, and a hand control member 116. Each of the elements shall be described in further detail below.

Located at proximal end portion 108 of shaft 106 is hand control member 116. Hand control member 116 in the illustrated embodiment, includes a handle with a hand grasping grip indent 126 and a lever 124. Lever 124 is pivotally connected about an axis point 128, such as a pin. Hand control member 116 is constructed such that a user can wrap their four fingers around lever 124 and squeeze it to cause lever 124 to move from an expanded position to a compressed position within a hollow recess 130 located in hand control member 116. A spring mechanism (not shown) within hand control member 116 causes lever 124 to move towards the expanded position when released. The construction and operation of squeeze hand control member 116 such as illustrated in FIGS. 1A, 1B, and 2, is understood by those skilled in the art. Further details and variations of squeeze type handles are described in U.S. Pat. No. 6,874,833 to Keith et al (the '833 patent) and U.S. Pat. No. 6,848,731 to Kubani et al (the '731 patent), and U.S. Pat. No. 4,962,957 to Traber (the '957 patent), all fully incorporated herein by reference.

In alternative embodiments (not shown), hand control mechanism may be implemented as pull finger trigger, a dial, a squeeze button, or other suitable hand or finger manipulated mechanisms as would be appreciated by those skilled in the art.

Hand control member 116 is in physical communication with shield 112 which includes movable members 118(1), 118(2). That is, hand control member 116 is connected, either directly or indirectly, to movable members 118(1), 118(2) located on distal end portion 110 of elongated shaft 106. Movable members 118(1), 118(2) are initially biased apart in an open position and are configured to move toward each other in reciprocating fashion from the open position to one or more closed positions (shown in FIG. 1B) through operation of hand control member 116.

Figure 5:
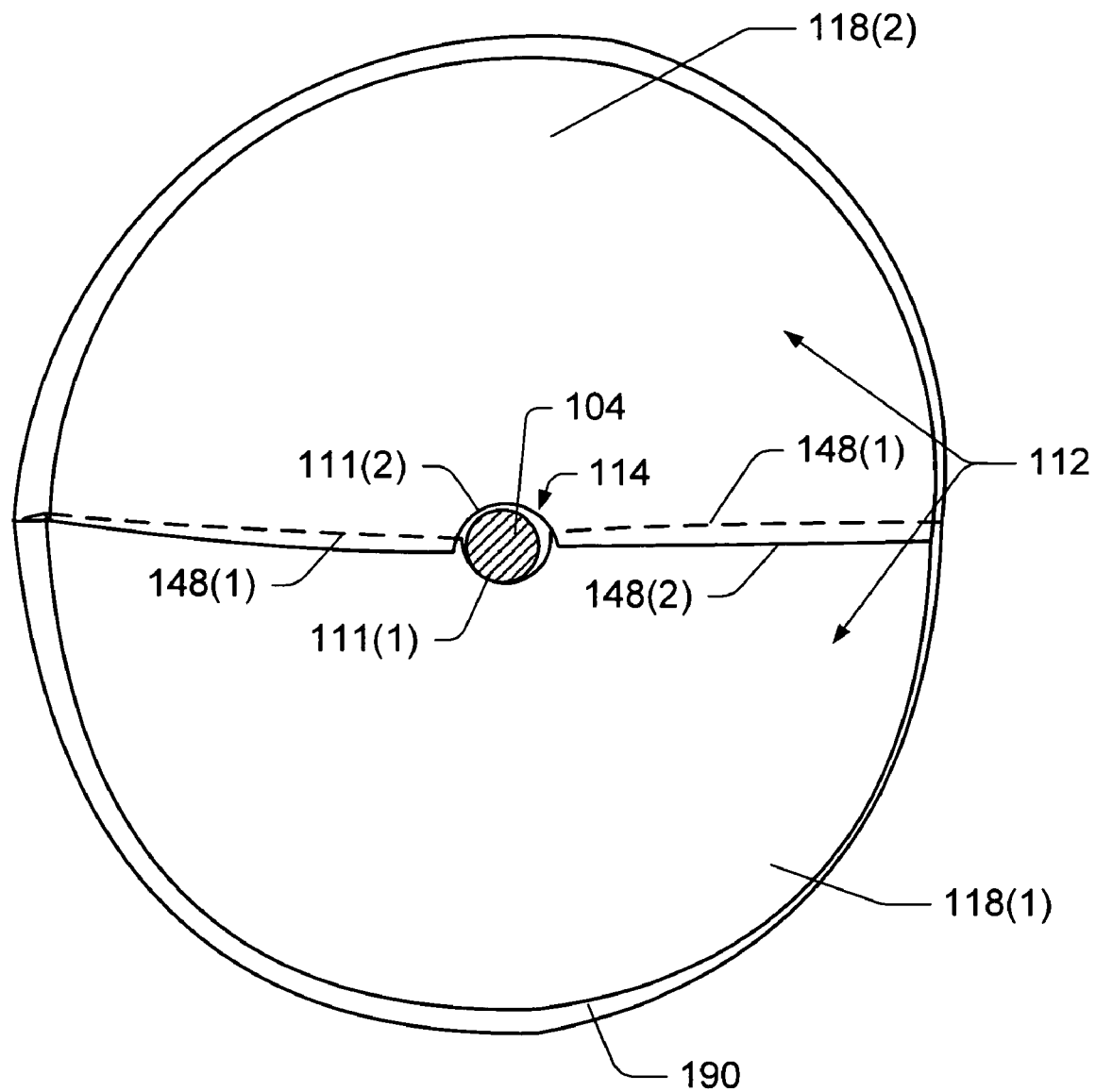
FIG. 5 shows a top view of the shield shown in FIG. 4, in a closed position with an aperture encircling a stem of a plant (spring members not shown).

As movable members 118(1), 118(2) are moved to a closed position such that they overlap or touch. If configured to overlap, movable members 118(1), 118(2) are misaligned slightly permitting one movable member to move underneath the other such that an edge 148(1) (FIGS. 1B and 5) of one movable member 118(1) moves past an edge 148(2) (FIGS. 1B and 5) of the other movable member 118(2). Edge 148(1) is illustrated in (FIGS. 1B and 5) as dashed line showing movable member 118(1) underneath movable member 118(2). Edges 148 of both movable members tend to change their angle as movable members move together.

A half circular cutout 111(1), 111(2) (FIGS. 1A, 1B, 2, 4, and 5) is positioned on each of the movable members 118 in opposing complementary fashion such that when movable members 118(1), 118(2) forming unitary shield 112 come together (see FIGS. 1B and 5) each half of the circular cutout 111 (also referred to as a notch) meets the other to form a full generally circular cutout 160 or any shape aperture 114 (FIGS. 1B and 5) in the unitary shield 112. The size of the circular cutout 160 (FIGS. 1B and 5) between movable members 118 is adjustable by controlling a distance the two movable members move toward each other in reciprocating fashion, thereby allowing cutout 160/aperture 114 in shield 112 to conform and adjust to different sized stems of targeted plants 104 for spraying of liquid chemicals.

Figure 3:
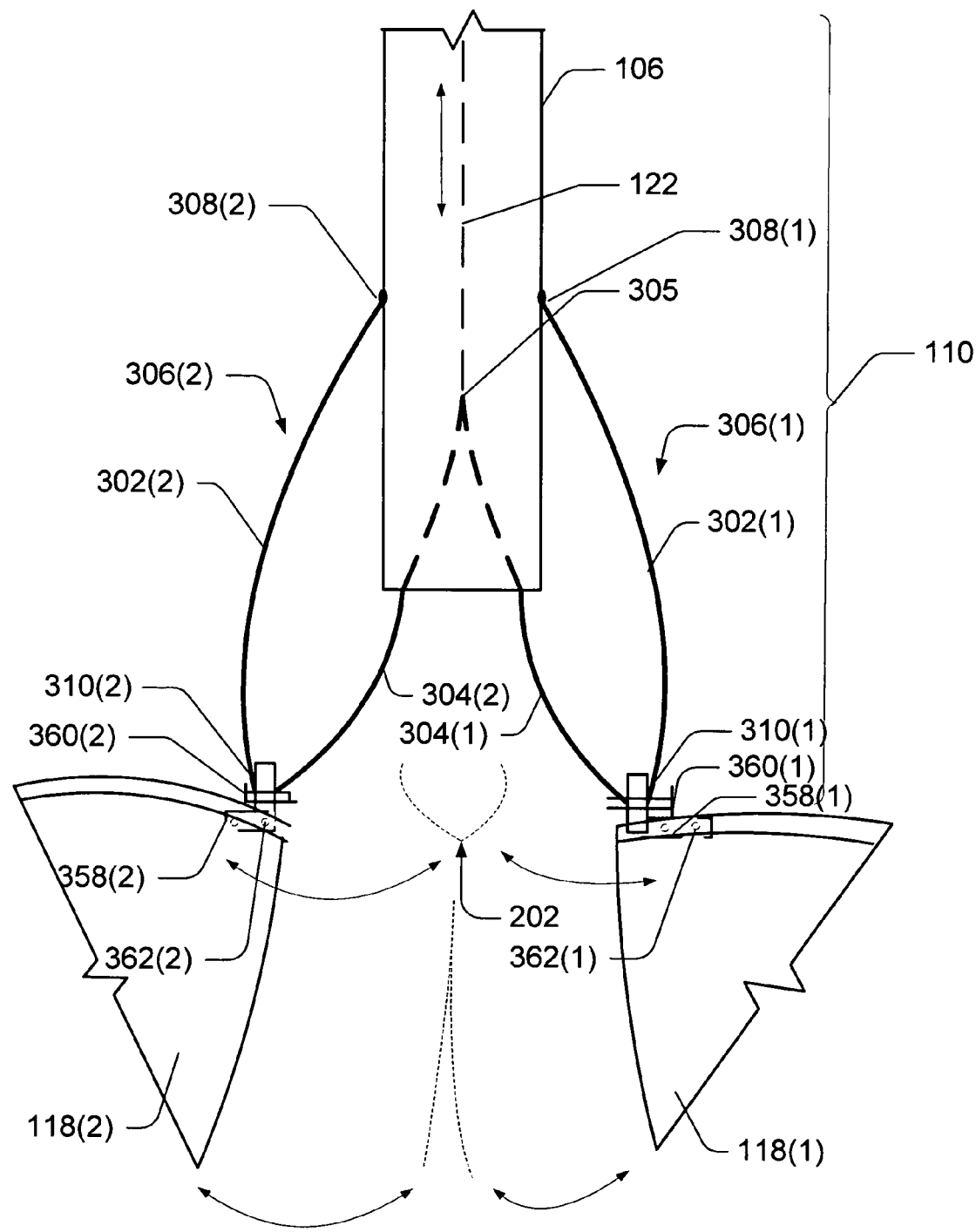
FIG. 3 shows a front view of a distal end portion of the gardening apparatus.

FIG. 3 shows a front view of distal end portion 110 of gardening apparatus 100. In this embodiment, movable members 118 are connected to a spring members 306 controlled by hand control mechanism 116. That is, movable members 118 are affixed to springs 306 of a pick-up tool. Grasping means, normally two rubber cups (not shown), were removed from a nut-bolt connection at the bottom of a spring mechanism from a commercial reaching tool and replaced with movable members 118(1), 118(2) via brackets 358(1), 358(2) (FIG. 3). Nuts/bolts 360(1), 360(2) (FIG. 3) connect a first end of brackets 358(1), 358(2) to spring members 306(1), 306(2) (FIG. 3). Nut/bolts 362(1), 362(2) connect a second end of brackets 358(1), 358(2) to movable members 118(1), 118(2), respectively. Brackets 358 are generally u-shaped members. Positioning and angling of each movable member 118, may be adjusted by positioning of each bracket such as by tightening of nuts/bolts 360 such that the relative angles of each movable member is slightly higher or lower than the other.

Figure 4:
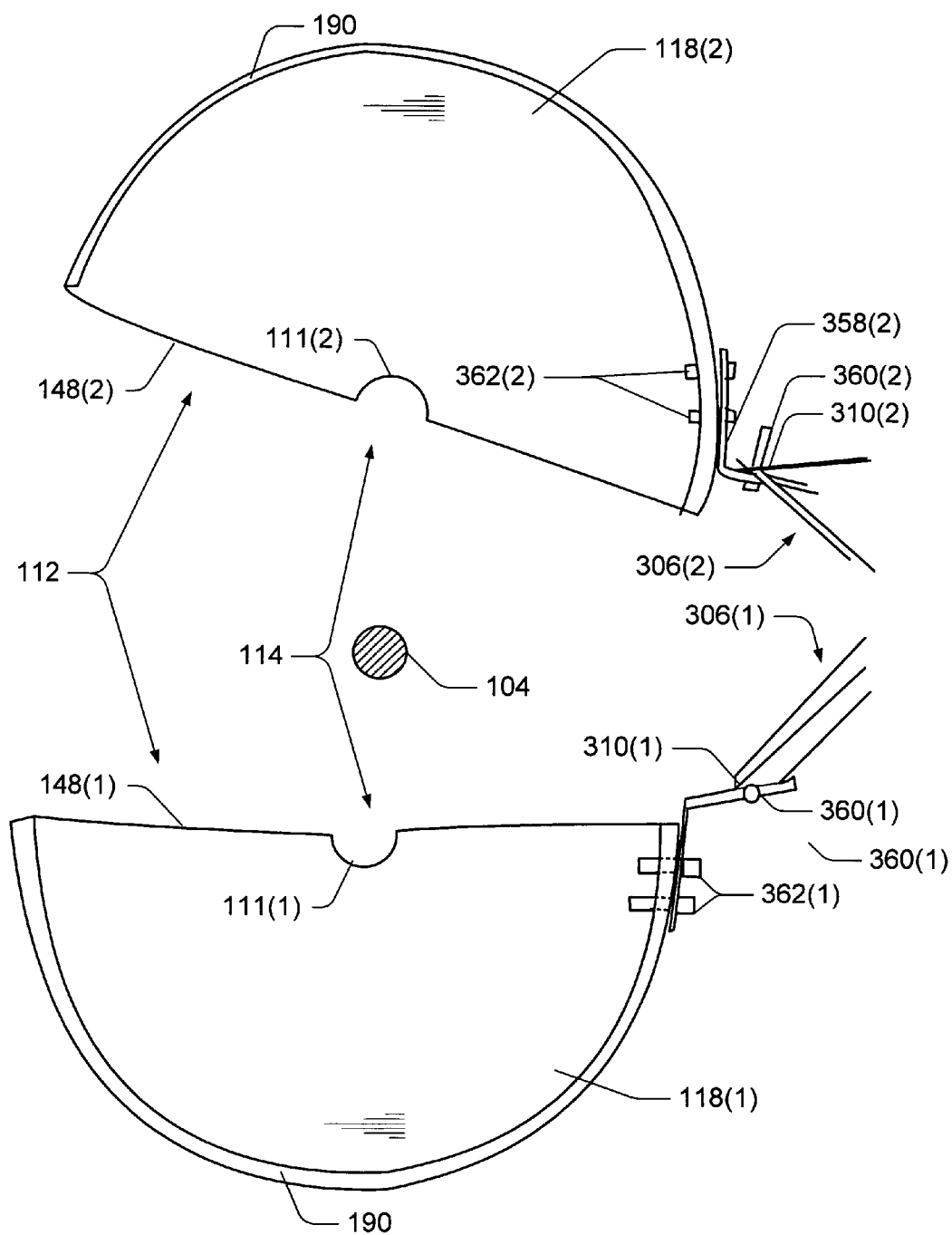
FIG. 4 shows a top view of the distal end portion of the gardening apparatus with the shield in an open position.

FIG. 4 also shows a top view of the distal end portion 110 of the gardening apparatus 100 with the shield 112 in an open position.

As would be appreciated by those skilled in the art, each movable member 118 may be attached to spring members 306 by other suitable fastening mechanisms, such as clips, rivets, solder, a groove/slot mating system or any other suitable fastening means.

Spring members 306(1), 306(2) include opposing outer springs 302(1), 302(2), and inner springs 304(1), 304(2) respectively. Outer springs 302(1), 302(2) are connected to shaft 106 by rivets 308(1), 308(2), respectively or any other suitable attachment means. Inner springs 304(1), 304(2) are attached (either directly or indirectly) to a cable 122 at a point 305 inside hollow shaft 106, such as via a nut and bolt system (not shown) or other suitable means. Outer springs 302 and inner springs 304 are attached to each other at their bottom ends 310(1), 310(2) by means of nut/bolt connections 360 described above.

Referring to FIG. 3, spring members 306(1), 306(2) are initially biased apart, when lever 124 (FIGS. 1A, and 2) is fully extended. That is, spring member 306(1), 306(2) are in a fully open position when lever 124 (FIGS. 1A and 2) is in a fully released position. In the fully open position, inner springs 304(1), 304(2) are spread and flex in diverging fashion by outer springs 302(1), 302(2). On the other hand, as lever 124 (FIG. 1B) is squeezed it causes cable 122 to move in an upward direction toward proximal end portion 108 (FIG. 1C), which, in turn, retracts inner springs 304 which causes outer springs 302 to bend toward each other.

The distance between spring members 306(1), 306 (2) can vary from a fully opened position, to one or more closed positions, (in which the movable members 118(1), 118(2) approach each other), or to a substantially closed position with spring members 306(1), 306(2) coming together and touching. The opening and closing of spring members is controlled by hand control member 116 as described above. The action of spring members 306 are known in the field of grabber tools, such as trash pick-up devices, and hand reachable extendable grabbing tools. For a more detailed explanation of how spring members 306 operate in conjunction with a hand control mechanism, refer to the '833 patent, the '731 patent, the '957 patent or U.S. Pat. No. 3,527,492 to Hollis, all fully incorporated herein by reference.

In one implementation, a prototype gardening apparatus 100 was constructed using a commercially available grabbing toot, known as the GOPHER™ reaching tool, sold by Ontel Products Corp. of Farfield, N.J. Shield 112 was constructed by culling a flying disc such as a Frisbee® type flying disc in half. Each semicircular cutout 111(1), 111(2) (forming aperture 114) was cut out of each half of the disc (each movable member 118) at a location approximately in the center of each half disc.

Each movable member 118 may be constructed of a lightweight material, such as plastic, rubber, a light metal, or one or more composite materials such that its surfaces are resistive to corrosion or rust and is impervious to liquids. As such, when each movable member 118 is brought together forming shield 112 (FIG. 2), shield 112 acts as a barrier to liquid and reaching underneath and surrounding areas of targeted plant.

As illustrated in the figures, each movable member 118 is semi-circular in shape, and hence shield 112 when formed is circular in shape (when movable members 118 come together). When they come together, and meet (or overlap) at edges 148(1), 148(2) (FIGS. 1B and 5), movable members 118 form a unitary shield 112, which is generally circular in shape. It is appreciated that each movable member 118 may be other shapes such as square or rectangular. Additionally, each movable member may be asymmetrical, with one side being larger or smaller than the other. Further, it is appreciated that each movable member may have an outwardly extended lip 190 (FIGS. 1A, 1B, 2, 4 and 5) which is flared to further deflect the splash or spray of fluid away from underlying fauna. Shield 112 may also be generally flat or conical in shape.

Typically in operation, a user of gardening apparatus 100 positions shield 112 in an open position with each cutout 111(1), 111(2) (FIG. 4) of aperture 114 aligned at some level with a targeted plant stem 104 (see also FIGS. 1A, and 2). Once in position, the user is able to squeeze lever 124 so that aperture 114 moves to one or more of its closed positions around a plant stem 104 (FIGS. 1B and 5) with shield 112 fully encircles the plant stem 104 (i.e., the stem is disposed axially therein). As aperture 114 is adjustable from an open position (FIGS. 1A, 2, and 4) to one or more closed positions (FIGS. 1B and 5), aperture 114 is configured to conform to different sized stems 104 of plants. The adjustability of the opening/closing of the shield 112 through hand control mechanism 116 permits targeting of different sized stems 104 as the shield can be configured to conform and fit around (e.g. surround) the stem 104 of a plant 101 whether thick or thin (see FIG. 5). As there is little-to-no gap once the shield is positioned around the stem of a plant, underlying vegetation 102 can be substantially protected from contact with the spray path of liquid chemicals. The shield also protects vegetation located in proximity to the targeted plant, as the shield extends a distance around the targeted stem providing a solid barrier to liquid chemicals.

Figure 6:
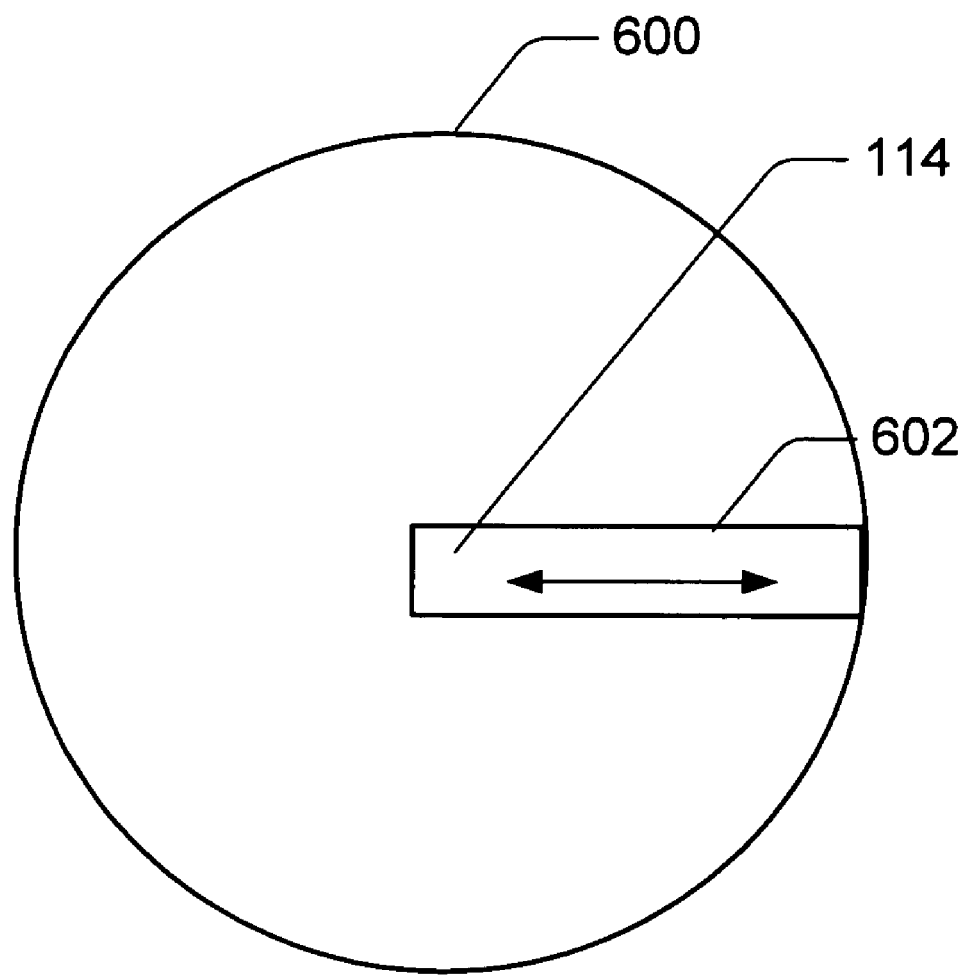
FIG. 6 shows an example of a single unitary shield having a movable slide in a retracted position.

Although shield 112 has been described as being formed using two movable members, it is possible to construct a solid shield with an open center (e.g. an aperture), that opens and closes through a spring operated slide or some other means controlled by cable 122 (FIG. 1). FIG. 6 shows an example of a single unitary shield 600 having a movable slide 602 in a retracted position. As shown therein, aperture 114 is rectangular in shape and may be as long as slide 602.

As should be appreciated from the foregoing gardening apparatus' 100 elongated shaft 106 facilitates a user spraying a targeted plant from a safe distance such as in an erect position.

It is to be understood that the present invention is not limited to the embodiments described above, but encompasses any and all embodiments within the scope of the subjoined Claims and their equivalents.

What is claimed is:

1. A gardening apparatus for shielding desired vegetation and surrounding areas from unwanted contact with a liquid chemical when the liquid chemical is sprayed on a targeted plant, the gardening apparatus comprising:
    an elongated shaft with a proximal end portion and a distal end portion;
    a shield located on the distal end portion of the elongated shaft having an aperture that is adjustable from an open position to a closed position, the aperture configured to conform to different sized stems of plants; and
    a hand control member located on the proximal end portion of the elongated shaft opposite the distal end portion, the hand control member in physical communication with the shield, configured to adjust the size of the aperture when the hand control member is manipulated, wherein the shield is positioned at the distal end portion of the elongated shaft, and forms a horizontal barrier that is substantially parallel to the ground when the aperture of the shield is adjusted around a stem of a plant, for protecting vegetation underneath the shield when herbicide is sprayed at a targeted plant.

2. The gardening apparatus as recited in claim 1, wherein the distal end portion and the proximal end portion are approximately between two and four feet apart.

3. The gardening apparatus as recited in claim 1, wherein the elongated shaft is approximately between two and four feet in length.

4. The gardening apparatus as recited in claim 1, wherein the shield comprises two movable members that are initially biased apart in the open position and move toward each other in reciprocating fashion from the open position to a closed position.

5. The gardening apparatus as recited in claim 1, wherein the shield comprises two movable members that are initially biased apart in the open position and move toward each other in reciprocating fashion from the open position to a closed position, wherein each movable member comprises a notch, wherein each notch is positioned in opposing complementary fashion such that when the two movable members of the shield come together each notch meets the other forming the aperture.

6. The gardening apparatus as recited in claim 1, wherein the shield comprises two movable members that are initially biased apart in the open position and move toward each other in reciprocating fashion from the open position to a closed position, wherein each movable member comprises a notch, wherein each notch is positioned in opposing complementary fashion such that when the two movable members of the shield come together each notch meets the other forming the aperture, wherein the size of the aperture between the two movable members can be adjusted by controlling a distance the two movable members are moved toward and away from each other in the reciprocating fashion.

7. The gardening apparatus as recited in claim 1, wherein the hand control member comprises a squeeze handle lever.

8. The gardening apparatus as recited in claim 1, wherein the hand control member comprises a finger movable trigger.

9. The gardening apparatus as recited in claim 1, wherein the hand control member comprises a squeeze handle lever wherein squeezing of the hand control member permits adjustment of the aperture from a fully opened position to one or more closed positions.

10. A gardening apparatus for shielding desired vegetation and surrounding areas from unwanted contact with a liquid chemical when the liquid chemical is sprayed on a targeted plant, the gardening apparatus comprising:
    an elongated shaft with a proximal end portion and a distal end portion;
    a shield located on the distal end portion of the elongated shaft having an aperture that is adjustable from an open position to one or more closed positions, the aperture configured to conform to different sized stems of plants, wherein the shield comprises two movable members each forming a portion of the shield, wherein the two movable members are initially biased apart in the open position and move toward each other in reciprocating fashion from the open position to the one or more closed positions, wherein each movable member comprises a notch, wherein each notch is positioned in opposing complementary fashion such that when the two movable members of the shield come together each notch meets the other forming the aperture, wherein the size of the aperture between the two movable members can be adjusted by controlling a distance the two movable members are moved toward and away from each other in the reciprocating fashion, wherein the shield is positioned at the distal end portion of the elongated shaft, and forms a horizontal barrier that is substantially parallel to the ground when the aperture of the shield is adjusted around the stem of a plant for protecting vegetation underneath the shield when herbicide is sprayed at a targeted plant; and
    a hand control member located on the proximal end portion of the elongated shaft opposite the distal end portion, the hand control member in physical communication with the shield, configured to move the two movable members from the open position to the one or more closed positions.

11. The gardening apparatus as recited in claim 10, wherein a cable connects the hand control member to the two movable members.

12. The gardening apparatus as recited in claim 10, further comprising a spring mechanism coupled to the two movable members, configured to initially bias the two moveable members apart in the open position.

13. The gardening apparatus as recited in claim 10, wherein each of the movable members forms a portion of the shield.

14. The gardening apparatus as recited in claim 10, wherein each of the movable members is semi-circular.

15. The gardening apparatus as recited in claim 10, wherein each notch is rounded.

16. The gardening apparatus as recited in claim 10, wherein when the aperture is in one or more of the closed positions and a plant stem is disposed axially therein, the shield fully encircles the plant stem.

* * * * *

UNITED STATES PATENT AND TRADEMARK OFFICE
CERTIFICATE OF CORRECTION

| | |
|---|---|
| PATENT NO. | : 7,581,350 B2 |
| APPLICATION NO. | : 11/526962 |
| DATED | : September 1, 2009 |
| INVENTOR(S) | : Richard M. Ram |

It is certified that error appears in the above-identified patent and that said Letters Patent is hereby corrected as shown below:

In column 4, at line 37, "preferably of a constructed of lightweight material" should read --preferably constructed of a lightweight material--.

In column 8, at line 64, "herbacide" should read --herbicide--.

Signed and Sealed this

Sixth Day of October, 2009

David J. Kappos
*Director of the United States Patent and Trademark Office*